3,268,654
INSULATING SLEEVE FOR A CABLE JOINT
Richard E. Morrison, Lyndhurst, and James H. McCulley, Ravenna, Ohio, assignors to The Johnson Rubber Co., Middlefield, Ohio, a corporation of Ohio
Filed Oct. 8, 1963, Ser. No. 314,713
5 Claims. (Cl. 174—138)

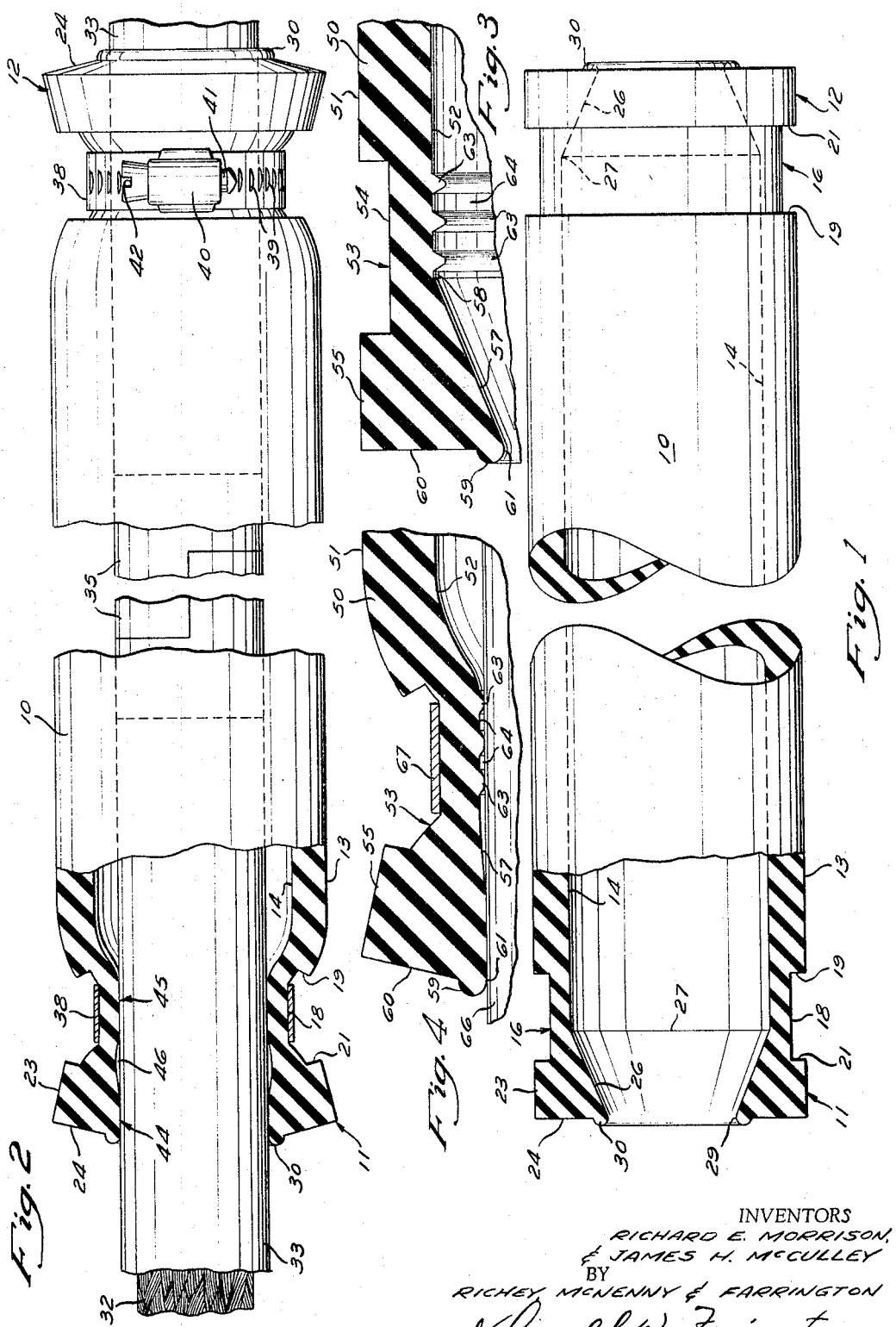

This invention relates generally to insulating sleeves adapted to fit over electrical cables to protect and insulate splices and connections in the cables.

A particular application of this invention relates to diesel electric locomotives. Locomotives of this type use a diesel engine to drive an electric generator, the output of which is supplied to individual traction motors on each of the axles of the locomotive. Since the locomotive is sprung on the trucks carrying the axles and since these trucks necessarily pivot relative to the locomotive frame to allow the locomotive to easily go around the curves, it is necessary to provide flexible cable connections between the generator and the traction motor. It is customary that these cables, while well insulated, must be capable of being disconnected for servicing the motor, and because such cables, although quite flexible, must be able to carry several hundred amperes at up to 600 volts, the connectors must have a relatively large contact area to minimize any possible voltage drop or resistance at the connector. Since these cables must hang down below the locomotive, they are exposed to the elements and to a large amount of dirt thrown up by the wheels as well as occasional pieces of ballast and the like which may be kicked up and thrown against the cables.

Therefore, it has been proposed to provide a separate insulating sleeve to cover the connectors in these cables, and because such connectors must be taken apart for routine servicing of the locomotive, and since the diameters of the cables and connectors may vary depending upon the current carrying capacity needed, it has been proposed to use a relatively large diameter rubber sleeve to fit over the connector and protect it while retaining the flexibility of the cable. However, since such sleeves must be easily removable, the sleeves are secured in place by a ring type clamp which compresses the rubber sleeve and reduces its diameter to grip the cable insulation at a point inward from the open end which then remains bell-mouthed. As a result it has been possible to have dirt and water work its way into this bell-mouthed end and by the wedging action of additional dirt being forced therein to pass between the sleeve and the cable insulation and thereby get into the interior.

The entry of water into the cable may cause carbon tracks to appear on the connector as well as allow corrosion to take place which may increase the resistance or otherwise contribute to the failure to the connector so that the entire cable assembly requires replacement. Another problem is that when efforts are made to further tighten the ring clamps to prevent any leakage, the rubber sleeve is forced so tightly against the cable insulation that continued weathering causes the sleeve to adhere to the insulation so as that to allow its removal for servicing the connector, it is necessary to cut the the sleeve off the cable, so that upon reassembly a new sleeve be used.

It is therefore a principal object of this invention to provide a new and improved insulating sleeve adapted to fit over joints and splices in heavy electrical cables which provides a seal with the cable insulation at the extreme outer ends of the sleeve to any dirt pocket between the sleeve and the cable insulation.

It is another object of this invention to provide an insulating sleeve as set forth in the preceding object having a double seal at each end of the sleeve between the sleeve and the cable insulation to provide more positive sealing against the entry of dirt and fluids into the interior of the sleeve.

It is another object of this invention to provide an insulating sleeve as set forth in the preceding objects which is adapted for use with several diameters of cables and which results in a minimum reduction in the flexibility of the cable with the insulating sleeve secured in place.

It is another object of this invention to provide an insulating sleeve as set forth in the preceding objects which is easily assembly in place and easily removed for reuse after servicing the portion of the cable within the sleeve.

It is still another object of this invention to provide an insulating sleeve as set forth in the preceding objects having a simplicity of construction for low cost and ease of manufacture while providing a long service life in use.

Further objects and advantages of this invention will readily become apparent to those skilled in the art upon a more complete understanding of the preferred embodiments of the invention as shown in the accompanying drawings and described in the following detailed description.

In the drawings:
FIGURE 1 is a side elevational view partially in section of an insulating sleeve according to the preferred embodiment of this invention;
FIGURE 2 is a side elevational view partially in section of the insulating sleeve of FIGURE 1 secured in place on a flexible insulated electrical cable;
FIGURE 3 is an enlarged fragmentary cross-section view of the end of an insulating sleeve according to another embodiment of this invention; and
FIGURE 4 is an enlarged fragmentary sectional view of the sleeve of FIGURE 3 secured in place on an insulated electrical cable.

Referring now to the drawings in greater detail, the insulating sleeve is in the form of a tubular casing 10 which is formed preferably by molding as a single piece of rubber or similar elastomeric material. The material chosen for the sleeve is preferably a material having a high degree of electrical insulating ability as well as high resistance to weathering and exposure, such as chloroprene, chlorosulfonated polyethylene, isobutylene isoprene, polybutadiene, ethylene propylene, and other similar elastomers. The casing 10 has end sections 11 and 12 which are spaced apart by a tubular center section having substantially uniform diameter outer and inner surfaces, 13 and 14, respectively. It will be understood that the length of the casing between the ends 11 and 12 is chosen in relation to the length of the connector therein and may be varied as required for the particular application. The wall thickness between the inner surface 14 and the outer surface 13 is chosen to give sufficient mechanical strength using a rubber compound having a durometer hardness of about 40 to 60.

The ends 11 and 12 are identical, and therefore only the sectioned end 11 as shown in FIGURE 1 will be described in detail. It will be noted that the end 11 is provided with an annular channel or groove 16 a spaced distance inward from the end. The groove 16 is formed by a cylindrical bottom wall 18 with inner and outer radial walls 19 and 21, respectively. The groove 16 is made wide enough to receive a band type clamp for securing the sleeve in position on the cable. Outward of the groove 16 as a result of the spacing of the groove inward from the end of the sleeve is a rib 23 having substantially the same outer diameter as the outer surface 13 of the center section of the sleeve. The end has a normally radially extending end face 24, and it will be seen that the inner surface of the end is formed by reduced tapering conical portion 26 which extends from its junction with the inner surface 14 at a point indicated at 27 intermediate the walls of groove 16 axially outward and radially inward to form a reduced diameter opening 29 to receive the cable. A bead 30 is formed at the opening 29 at the junction between the end face 24 and the conical portion 26 to avoid the presence of a feather edge with its attendant susceptability toward cutting and splitting of the rubber.

FIGURE 2 shows the sleeve secured in position on an electrical cable 32. The cable 32 is shown as having a smooth insulating covering 33 although the sleeve may be used with cables having an abrasion resistant woven sheath over the insulation. As shown, the cable 32 includes a connector 35 between the two cable ends which may be disassembled for service work on the traction motor. When the sleeve is to be assembled on a cable, the connector 35 is taken apart and the sleeve forced over one of the cable ends. It will be seen that the sleeve is designed so that the inner bore 14 is substantially larger in diameter than the outer diameter of the insulating covering 33, so as to prevent any possible binding between the central portion of the sleeve and the cable which would substantially decrease the flexibility of the cable.

The dimensions of the sleeve are chosen so that the opening 29 has a diameter when the sleeve is in the free state shown in FIGURE 1 somewhat less than the outer diameter of the insulating cover 33. Thus, to force the sleeve over the cable, it is necessary to somewhat expand the opening 29 and thus insert the cable end through this opening until both ends of the sleeve have been placed over one end of the cable so that the connector 35 may be joined together and the sleeve slid back into a position with the ends straddle the connector. Although it is necessary to expand the opening 29, this does not require a great deal of force since rubber is relatively soft and the conical portion 26 tapers relatively sharply so that only the portion at the rib 23 must be expanded.

When the sleeve is positioned around the cable 32, since the opening 26 is expanded, the portion of the end at the bead 30 will resiliently grip the insulating covering 33 and thereby provide a seal at this point. However, in service it is generally desirable that the sleeve be secured in place against axial movement along the cable, and to do this clamps are placed in the grooves 16. These clamps are preferably of the type having a flat metal band 38 which may be constricted in diameter. The clamp has a housing 40 containing a screw 41 engaging slots 39 on the band and rotated by the slotted end 42 so that the peripheral length of the band 38 is decreased to force the cylindrical walls 18 of the groove inward until, as shown on the left hand side of FIGURE 2 in section, this portion is forced into gripping contact with the insulating covering 33. In this position, since the clamp firmly holds the sleeve against the casing, the sleeve will be fixed in position and will not slide along the cable.

When the sleeve is thus clamped, a double seal is provided with one seal being at the outer seal zone 44 adjacent the bead 30 and the second at the inner seal zone 45 beneath the band 38. Between these seal zones 44 and 45 there may be an air space 46, although depending upon the amount of tightening of the band 38 and the position of the band 38 along the groove 16, this air space may not be present.

It should be noted that since the rearward or axially inner part of the conical portion 26 at its junction 27 to the inner bore 14 lies intermediate the groove walls 19 and 21, when the band 38 is clamped in position the greater rigidity of this portion due to its increased wall thickness allows the band to provide an additional clamping force through the relatively heavy rubber section of the rib 23 to transmit some of the clamping forces to the outer seal zone 44 adjacent the bead 30. Thus, the tightening of the band 38 not only provides a clamping to secure the sleeve against axial movement along the cable, it also provides the sealing contact between the sleeve and the insulation at the inner zone 45 and produces an additional sealing force at the outer seal zone 44. However, because of the outer seal between the sleeve and the insulating cover 33 at the bead 30, the band need not be tightened to such a degree that the sealing contact pressure at the inner seal zone might cause bonding between the sleeve and the cover which would prevent easy removal of the sleeve for service of the connector 35.

In another embodiment shown in FIGURES 3 and 4, the sleeve has the same general construction as the sleeve of FIGURES 1 and 2. As shown therein the casing 50 has outer and inner surfaces 51 and 52 and is provided with an annular groove 53 spaced axially inward from a rib 55 and having a cylindrical wall portion 54 of reduced diameter. A reduced conical portion 57 extends from a point of junction at 58 with the inner casing surface 52 and tapers radially inwardly and axially outwardly to a bead 59 formed at the junction with the end face 60 and defining the cable receiving opening 61. Beneath the cylindrical wall 54 of groove 53, the inner surface is provided with several circumferential V-shaped annular ridges 63 spaced apart axially by grooves 64 having substantially the same diameter as that of the inner surface 52.

When the sleeve of FIGURE 3 is assembled in place upon a cable 66 as shown in FIGURE 4, the clamp band 67 forces the ridges 63 into contact with the surface of cable 66 and by the compression of the ridges 63, there is formed a plurality of individual seal zones having a relatively high contact pressure between the ridges 63 and the surface of cable 66. As a result of these zones of high seal contact pressure, a greater degree of sealing is produced in the inner sealing zone to augment the sealing produced around the bead 59 at the outer sealing zone adjacent the rib 55.

Although several embodiments of the invention have been shown in the drawings and described in the foregoing detailed description, it is recognized that persons skilled in the art may readily resort to other arrangements and embodiments without departing from the scope of the invention as defined in the following claims.

What is claimed is:

1. An insulating sleeve of elastomeric material adapted to fit over an electric cable and having a tubular center section and a pair of end sections, said center section having an internal diameter substantially greater than that of said cable, each of said end sections having a radially extending end face, each of said end sections having a conical internal surface tapering radially inward and axially outward toward the end face from said center section to provide an opening of reduced diameter at said end face adapted to make resilient sealing engagement with the outer surface of a cable passing through said sleeve, each of said end sections having an annular groove on the outer periphery spaced from said end face, said groove having axially spaced sidewalls, the origin of said conical internal surface being at least outward of the axially innermost groove sidewall, said groove being adapted to receive a clamp to restrict the diameter of said groove and force said sleeve radially inward whereby the inner periphery of said sleeve underlying said groove is pressed into sealing engagement with said cable a spaced distance inward from said end face.

2. An insulating sleeve of elastomeric material adapted to fit over an electric cable and having a tubular center section and a pair of end sections, said center section having a cylindrical inner surface with a diameter substantially greater than that of said cable, each of said end sections having a radially extending end face, each of said end sections having a conical internal surface tapering radially inward and axially outward toward the end face from the inner surface of said center section to provide an opening of reduced diameter at said end face adapted to make resilient sealing engagement with the outer surface of a cable passing through said sleeve, each of said end sections having an annular groove on the outer periphery spaced from said end face, said groove having axially spaced sidewalls, the origin of said conical internal surface being intermediate said groove sidewalls, said groove being adapted to receive a clamp to restrict the diameter of said groove and force said sleeve radially inward whereby the inner periphery of said sleeve underlying said groove is pressed into sealing engagement with said cable a spaced distance inward from said end face.

3. An insulating sleeve of elastomeric material adapted to fit over an electric cable and having a tubular center section and a pair of end sections, said center section having an internal diameter substantially greater than that of said cable, each of said end sections having a radially extending end face, each of said end sections having a conical internal surface tapering radially inward and axially outward toward the end face from said center section to provide an opening of reduced diameter at said end face adapted to make resilient sealing engagement with the outer surface of a cable passing through said sleeve, each of said end sections having an annular groove on the outer periphery spaced from said end face, said groove having axially spaced sidewalls, the origin of said conical internal surface being at least outward of the axially innermost groove sidewall, said groove being adapted to receive a clamp to restrict the diameter of said groove and force said sleeve radially inward and at least one annular ridge on the inner periphery of said sleeve axially inward of said conical surface in axial alignment with said groove whereby constriction of said sleeve by said clamp brings said ridge into sealing contact with the surface of said cable a spaced distance inward from the seal adjacent said end face.

4. An insulating sleeve adapted to fit over an electric cable and comprising a single piece of elastomeric material, said sleeve including a center section and a pair of end sections, said center section having a cylindrical outer surface and a cylindrical inner surface substantially greater in diameter than the outer diameter of the cable, each of said end sections having an end face having an outer diameter substantially equal to the outer diameter of said center section, an annular groove on the outer periphery of each end section, said groove having a cylindrical bottom wall having a diameter less than the outer diameter of said center section and greater than the inner diameter of said center section, said groove having axially spaced radial side walls extending from said bottom wall to the outer surface, the axially outer side wall of said groove being spaced axially from said end face to define a rib having an outer diameter substantially equal to that of said center section, each of said end sections having a conical internal surface, said conical surface forming a junction with the cylindrical inner surface of said center section at a point axially intermediate the side walls of said groove, said conical surface tapering axially outward and radially inward to form an opening at the junction between said conical surface and said end face having an internal diameter less than that of said cable, an annular bead projecting axially from said end face adjacent said opening, whereby when said sleeve is placed over an electric cable, each of said end sections is adapted to make sealing contact with the surface of said cable at an outer zone adjacent said bead and at an inner zone beneath said annular groove, said outer zone seal being formed by the resilient contact between the portion of said end section underlying said rib against said cable and said inner zone seal being formed by constricting said sleeve at said annular groove by means of a clamp adapted to constrict the wall of said sleeve at said groove radially inward to bring the inner surface of said sleeve into sealing contact with said cable.

5. An insulating sleeve adapted to fit over an electric cable and comprising a single piece of elastomeric material, said sleeve including a center section and a pair of end sections, said center section having a cylindrical outer surface and a cylindrical inner surface substantially greater in diameter than the outer diameter of the cable, each of said end sections having an end face having an outer diameter substantially equal to the outer diameter of said center section, an annular groove on the outer periphery of each end section, said groove having a cylindrical bottom wall having a diameter less than the outer diameter of said center section and greater than the inner diameter of said center section, said groove having axially spaced radial side walls extending from said bottom wall to the outer surface, the axially outer side wall of said groove being spaced axially from said end face to define a rib having an outer diameter substantially equal to that of said center section, each of said end sections having a conical internal surface, said conical surface forming a junction with the cylindrical inner surface of said center section at a point axially intermediate the side walls of said groove, said conical surface tapering axially outward and radially inward to form an opening at the junction between said conical surface and said end face having an internal diameter less than that of said cable, an annular bead projecting axially from said end face adjacent said opening, a plurality of axially spaced, continuous annular V-shaped ridges on the inner surface of said sleeve axially inward of said conical surface and axially outward of the inner groove side wall, whereby when said sleeve is placed over an electric cable, each of said end sections is adapted to make sealing contact with the surface of said cable at an outer zone adjacent said bead and at an inner zone beneath said annular groove, said outer zone seal being formed by the resilient contact between the portion of said end section underlying said rib against said cable and said inner zone seal being formed by constricting said sleeve at said annular groove by means of a clamp adapted to constrict the wall of said sleeve at said groove radially inward to bring said annular ridges into sealing contact with said cable.

References Cited by the Examiner

UNITED STATES PATENTS

| | | | |
|---|---|---|---|
| 743,346 | 11/1903 | Swain | 174—84 |
| 2,316,267 | 4/1943 | McLarn | |
| 2,680,145 | 6/1954 | Lanfear | 174—84 |
| 2,722,667 | 11/1955 | Huston | 339—94 X |
| 2,904,769 | 9/1959 | Sampson et al. | 174—77 X |
| 2,935,720 | 5/1960 | Lorimer | |

FOREIGN PATENTS

| | | |
|---|---|---|
| 250,724 | 10/1962 | Australia. |
| 867,346 | 5/1961 | Great Britain. |

LARAMIE E. ASKIN, *Primary Examiner.*

ROBERT K. SCHAEFER, *Examiner.*